United States Patent
Raubacher et al.

(10) Patent No.: US 10,417,789 B2
(45) Date of Patent: Sep. 17, 2019

(54) MOTION BLUR USING CACHED TEXTURE SPACE BLUR

(71) Applicant: Microsoft Technology Licensing, LLC., Redmond, WA (US)

(72) Inventors: Chris Raubacher, Redmond, WA (US); Kelly Renner, Seattle, WA (US); Dave Driver, Redmond, WA (US); Conroy Williamson, Kirkland, WA (US); Jose Rodriguez, Redmond, WA (US); Jeff Arnold, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/618,105

(22) Filed: Jun. 8, 2017

(65) Prior Publication Data
US 2017/0278276 A1 Sep. 28, 2017

Related U.S. Application Data

(62) Division of application No. 14/550,762, filed on Nov. 21, 2014, now Pat. No. 9,704,272.

(51) Int. Cl.
| G06T 11/00 | (2006.01) |
| G06T 5/00 | (2006.01) |
| G06T 11/20 | (2006.01) |
| G06T 13/80 | (2011.01) |

(52) U.S. Cl.
CPC ............ *G06T 11/001* (2013.01); *G06T 5/003* (2013.01); *G06T 11/203* (2013.01); *G06T 13/80* (2013.01)

(58) Field of Classification Search
CPC .......................... H04N 19/51; H04N 21/4318
See application file for complete search history.

(56) References Cited

U.S. PATENT DOCUMENTS

| 5,809,219 A | 9/1998 | Pearce et al. |
| 6,396,502 B1 | 5/2002 | Cunniff |

(Continued)

FOREIGN PATENT DOCUMENTS

| KR | 20040094414 | 1/2007 |
| TW | 512283 | 12/2002 |
| WO | WO2004090815 | 10/2004 |
| WO | WO2014/000155 | 1/2014 |

OTHER PUBLICATIONS

Akenine-Moller, et al., "Stochastic Rasterization using Time-Continuous Triangles", Graphics Hardware, Jan. 1, 2007, retrieved from the internet at URL:/http://dx.doi.org/10.2312/EGGH/EGGH07/007-016.

(Continued)

*Primary Examiner* — Antonio A Caschera
(74) *Attorney, Agent, or Firm* — Arent Fox LLP

(57) ABSTRACT

Aspects of the present disclosure includes methods for realistic real-time motion blur of a primitive. The methods can calculate a first movement of a primitive, blur texture space data based on the first movement, cache the blurred texture space data, and re-use the blurred texture space data when later movement of the primitive calculated at a later time is found to be similar to the first movement. The methods can re-blur the texture space data to generate second blurred texture space data, store second blurred texture space data, and use the second blurred texture space data to generate blurred primitives if the later movement differs by a threshold amount from the first movement.

20 Claims, 9 Drawing Sheets

(56) References Cited

U.S. PATENT DOCUMENTS

| | | | |
|---|---|---|---|
| 6,438,275 | B1 | 8/2002 | Martins et al. |
| 6,956,576 | B1 | 10/2005 | Deering et al. |
| 7,616,220 | B2 | 11/2009 | Baxter |
| 8,319,778 | B2 | 11/2012 | Sayre et al. |
| 8,400,454 | B2 | 3/2013 | Bleiweiss |
| 2003/0007701 | A1 | 1/2003 | Herf |
| 2007/0120858 | A1 | 5/2007 | Meinds |
| 2011/0254973 | A1 | 10/2011 | Nishiyama |
| 2012/0300025 | A1 | 11/2012 | Tchoukaleysky |
| 2014/0333669 | A1* | 11/2014 | Stich .................. G06T 5/002 345/634 |
| 2015/0043786 | A1 | 2/2015 | Ohki |

OTHER PUBLICATIONS

Elias, "Motion Blur", Internet Citation, Oct. 25, 1999, retrieved from the internet at URL://http://freespace.virgin.net/hugo.elias/updates.htm on Mar. 2, 2005.

Hargreaves, "Detail Texture Motion Blur", Nov. 26, 2013, retrieved from the internet at URL https://web.archive.org/web/20131126231018/http://shawnhargreaves.com/detail_blur/detail_blur.html on Feb. 2, 2016.

"International Preliminary Report on Patentability Issued in PCT Application No. PCT/US2015/060244", dated Jan. 30, 2017, 12 Pages.

Loviscach, et al., "Motion Blur for Textures by Means of Anisotropic Filtering", Proceedings of the Sixteenth Eurographics Conference on Rendering Techniques, Jun. 29, 2005, pp. 105-110.

Office Action for U.S. Appl. No. 14/550,762, dated Sep. 14, 2016, Raubacher et al., "Motion Blur Using Cached Texture Space Blur", 14 pages.

PCT Search Report and Written Opinion dated Feb. 19, 2016 for PCT application No. PCT/US2015/060244, 17 pages.

Written Opinion of the International Preliminary Examining Authority for PCT application No. PCT/US2015/060244, 11 pages.

Ritchie, et al., "Split Second Motion Blur", Proceeding SIGGRAPH 2010, Jan. 1, 2010, p. 1.

Shimizu, et al., "Hardware Accelerated Motion Blur Generation", Eurographics, Cambridge, GB, vol. 22, No. 3, Sep. 1, 2003, pp. 1-6.

\* cited by examiner

MOTION BLUR USING CACHED TEXTURE SPACE BLUR

CROSS-REFERENCE TO RELATED APPLICATION(S)

This application is a Divisional of and claims priority to U.S. application Ser. No. 14/550,762, filed on Nov. 21, 2014 and entitled "Motion Blur Using Cached Texture Space Blur," the entirety of which is incorporated herein by reference.

BACKGROUND

Motion blur is a streak-like artifact present in images where movement of an object being photographed causes exposure of multiple locations of the film or sensor of the camera. Computerized approximation of this artifact in real-time is prohibitively costly and prior methods employed to recreate motion blur in real time are unsatisfactory because they either did not achieve realistic results in all scenarios or they could not be computed in real-time due to their processing cost. For example, former techniques produced inferior results such as processing costs that were too high to be achieved by devices with less processing power, unrealistic results such as the "stamping" common to accumulation buffers and uttering primitives, artifacts, or lack of change in blur based on change in velocity of an object or the "camera."

SUMMARY

The techniques discussed herein facilitate realistic real-time motion blur of a primitive. In at least one example, a primitive can be in motion in an animation. In some examples, the primitive can be an object in an image. The techniques discussed herein can calculate a first movement of a primitive, blur texture space data based on the first movement, cache the blurred texture space data, and re-use the blurred texture space data when subsequent movement(s) of the primitive is determined to be similar to the first movement. In at least one example, the primitive can comprise an arbitrary shape and the techniques discussed herein can blur the arbitrary shape based at least in part on a first movement of the arbitrary shape and re-use the blurred arbitrary shape based at least in part on a second movement of the arbitrary shape that is similar to the first movement. The techniques discussed herein can re-blur the texture space data and store second blurred texture space data if a subsequent movement differs by a threshold amount from the first movement.

This Summary is provided to introduce a selection of concepts in a simplified form that are further described below in the Detailed Description. This Summary is intended to be used as an aid in determining the scope of the claimed subject matter. The term "techniques," for instance, can refer to system(s), method(s), computer-readable media/instructions, module(s), algorithms, hardware logic (e.g., Field-programmable Gate Arrays (FPGAs), Application-Specific Integrated Circuits (ASICs), Application-Specific Standard Products (ASSPs), System-on-a-chip systems (SOCs), Complex Programmable Logic Devices (CPLDs)), and/or technique(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
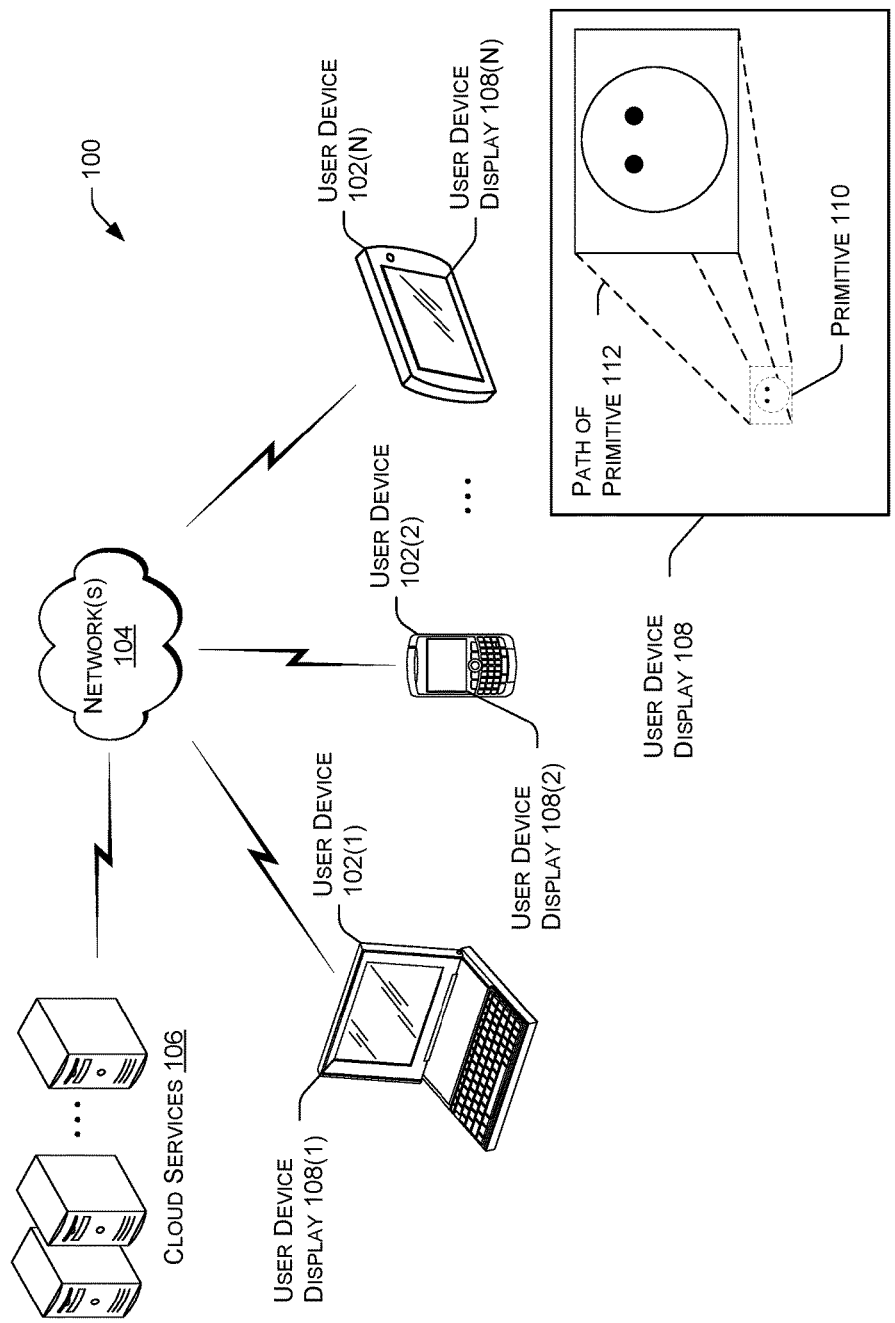
FIG. 1 is a diagram depicting an example environment in which examples of a framework for generating motion blur via cached texture space data can operate.

For the sake of simplicity, "moving" objects or primitives are those that are moving relative to the direction in which the camera or point of view (POV) is pointed over time and "immobile" objects or primitives are those that remain in the same or a similar position relative to the direction in which the camera or POV is pointed over time. In other words, in various examples, a camera or POV can pan during exposure and it is this motion that can cause motion blurring. Similarly, the camera or POV can stay substantially still and objects that are moving in space can cause the motion blurring. In some examples, a "similar position" entails some movement, but not enough motion to cause motion blur noticeable to cursory examination or human perception. Furthermore, since the techniques described herein simulate an artifact of photography, the term "camera" is used herein to refer to photography equipment whereas POV is used herein to refer to the view of a scene apparent in a representation of a scene. In some examples, the POV can be the point of view apparent to a user viewing an image or an animation of a scene.

Examples described herein provide techniques to generate motion blur at a low processing cost and without sacrificing motion blur quality. Motion blur has certain characteristics replicated by these techniques that previous techniques do not replicate in whole or in part. For example, when an object is motion-blurred in an image other objects that are immobile remain clear, including objects behind blurred objects and objects in front of the blurred objects and motion blur appears as a continuous streak. Former techniques produced inferior results such as processing costs that were too high to be achieved by devices with less processing power, unrealistic results such as the "stamping" common to accumulation buffers and jittering primitives, artifacts such as inappropriately occluding or showing motion-blurred objects, or lack of change in blur based on change in velocity of the object or camera.

In at least one example, the techniques can calculate the displacement of a primitive in a current frame or image, blur the texture space data of the primitive according to the calculated displacement, store the blurred texture space data, and generate a blurred primitive based at least in part on the blurred texture space data. In at least one example, the techniques can blur any arbitrary shape by generating an image that contains the arbitrary shape in image space or in texture space. In some examples, if the image containing the arbitrary shape is generated is generated in image space, the techniques can map the image containing the arbitrary shape to scene space in order to blur the resultant texture space data based at least in part on displacement data. At least one example, the blurred resultant texture space data can then be stored and used to generate a blurred primitive, the blurred primitive comprising a blurred version of the arbitrary shape. In some examples, if the image that contains the arbitrary shape is generated in texture space then the techniques can blur and store the texture space data without first mapping the image to texture space. Furthermore, In at least one example, the techniques can calculate a second displacement of the primitive in a second frame, determine that the second displacement is similar to the displacement, and generate a blurred primitive based at least in part on the previously stored blurred texture space data. In yet another example, the techniques can calculate a second displacement of the primitive in a second frame, determine that the second displacement is not similar enough to the displacement, blur the texture space data to generate second blurred texture space data, and generate a blurred primitive based at least in part on the second blurred texture space data.

These techniques can reduce the number of processor cycles required to generate motion-blurred objects in a scene. Because of this, both high end devices with greater processing power and low end devices with minimal processing power are able to render motion-blurring without pre-processing. This allows devices to allot more processing power to other functionality, thereby affording a better user experience. By not needing to generate motion-blurring through pre-processing, primitives can be dynamically blurred. In other words, primitives of different or unpredicted types and taking unforeseen paths can be motion-blurred without having to anticipate what primitives will be moving and what path they will take before real-time display of the primitives. Furthermore, motion blurring that is realistic and dynamic, as described, was not possible for devices without enough processing power in this technical field before this invention.

The techniques and systems described herein can be implemented in a number of ways. Example implementations are provided below with reference to the following figures. The implementations, examples, and illustrations described herein can be combined.

Illustrative Environment

FIG. 1 is a block diagram depicting an example environment 100 in which examples described herein can operate. In some examples, the various devices and/or components of environment 100 include user devices 102 that can communicate with one another and with external devices, such as cloud services 106, via one or more networks 104.

For example, network(s) 104 can include public networks such as the Internet, private networks such as an institutional and/or personal intranet, or some combination of private and public networks. Network(s) 104 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 104 can utilize communications protocols, including packet-based and/or datagram-based protocols such as internet protocol (IP), transmission control protocol (TCP), user datagram protocol (UDP), or 122 other types of protocols. Moreover, network(s) 104 can also include a number of devices that facilitate network communications and/or form a hardware basis for the networks, such as switches, routers, gateways, access points, firewalls, base stations, repeaters, backbone devices, and the like.

In some examples, network(s) 104 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 1302.11 standards (e.g., 1302.11g, 1302.11n, and so forth), and other standards.

In various examples, user devices 102 include computing devices such as devices 102(1)-102(N). Examples support scenarios where device(s) 102 can include one or more computing devices that operate in a cluster or other grouped configuration to share resources, balance load, increase performance, provide fail-over support or redundancy, or for other purposes. Device(s) 102 can include a diverse variety of device types and are not limited to any particular type of device. Similarly, device(s) 102 can operate without sharing resources or relying on other device(s) 102. Furthermore, device(s) 102 can operate without being communicatively linked.

In some examples, device(s) 102 may be connected to cloud services 106 through the network(s) 104. Cloud services 106 can comprise one or more computing devices. In various examples, the cloud services 106 may have instructions stored thereon to generate motion-blurred primitives using the techniques described herein. For example, the cloud services 106 may blur texture space data.

In at least one example, device(s) 102 can comprise a display 108 upon which the device(s) 102 draw a primitive 110. The device(s) 102 can have instructions stored thereon to draw a movement of the primitive 110 with motion blur. FIG. 1 depicts the primitive 110 as a rectangle with a circle and two dots thereon as an example. In at least one example, there may be more than one primitive and the instructions stored on the device(s) 102 can further include instructions to cause the primitives to change location as part of an animation. In the example shown in FIG. 1 the primitive moves from a location in the lower left of the user device display 108 to an upper right location while increasing in size.

Illustrative Device(s) and Modules

Figure 2:
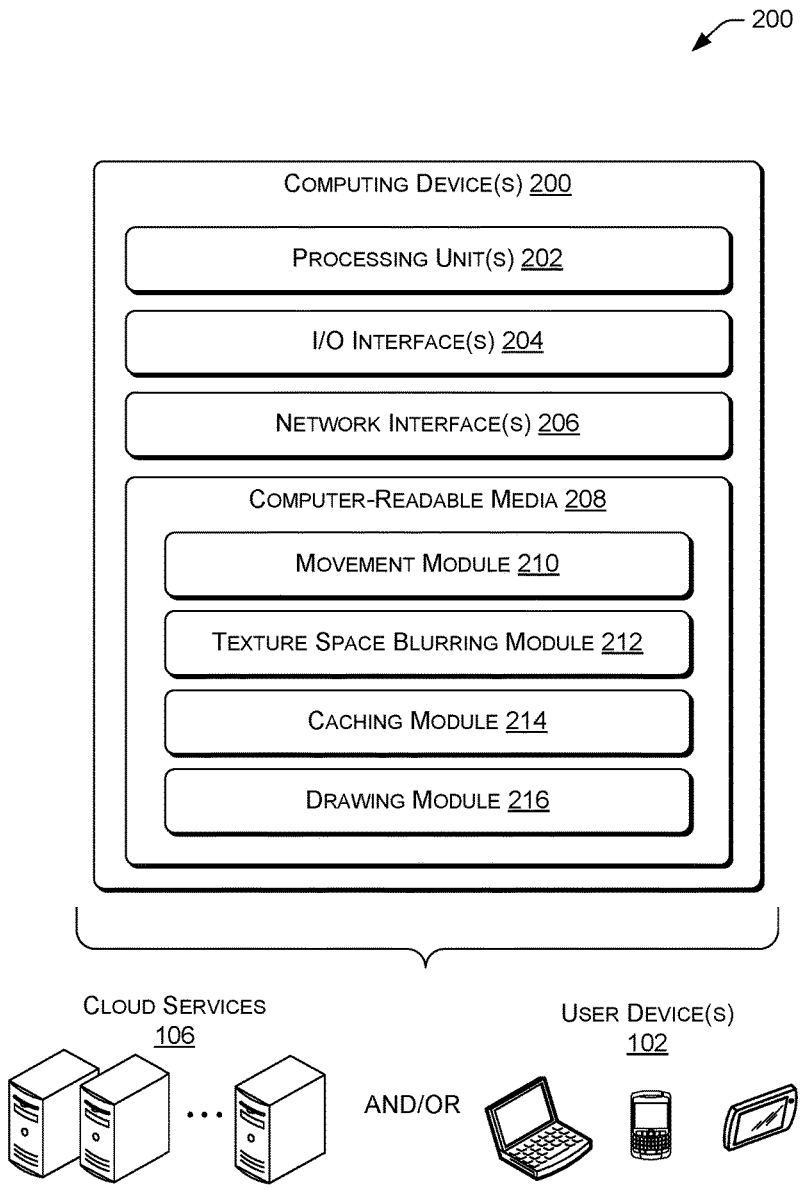
FIG. 2 is a block diagram depicting example devices that can generate motion blur using cached texture space data.

FIG. 2 depicts illustrative devices 200, which as illustrated can represent user device(s) 102 and/or cloud services devices 106. The illustrative device(s) can include any type of computing device having one or more processing unit(s) 202, operably connected to computer-readable media 208. The connection can be via a bus, which in some instances can include one or more of a system bus, a data bus, an address bus, a PCI bus, a Mini-PCI bus, and any variety of local, peripheral, and/or independent buses, or via another operable connection.

The illustrative device(s) can include any type of computing device having one or more processing unit(s) 202 operably connected to computer-readable media 208, I/O interfaces(s) 204, and network interface(s) 206. Computer-readable media 208 can have a movement module 210, texture space blurring module 212, caching module 214, and drawing module 216 stored thereon.

The computer-readable media 208 can include, at least, two types of computer-readable media, namely computer storage media and communication media. Computer storage media can include volatile and non-volatile, non-transitory machine-readable, removable, and non-removable media implemented in any method or technology for storage of information (in compressed or uncompressed form), such as computer (or other electronic device) readable instructions, data structures, program modules, or other data to perform processes or methods described herein. The computer-readable media 112 and the computer-readable media 122 are examples of computer storage media. Computer storage media includes, but is not limited to hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions.

In contrast, communication media can embody computer-readable instructions, data structures, program modules, or other data in a modulated data signal, such as a carrier wave, or other transmission mechanism. As defined herein, computer storage media does not include communication media.

The illustrative device(s)s can include, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device such as one or more separate processor device(s), such as CPU-type processors (e.g., micro-processors), GPUs, or accelerator device(s).

In some examples, as shown regarding the illustrative device(s), computer-readable media 208 can store instructions executable by the processing unit(s) 202, which can represent a CPU incorporated in the illustrative device(s). Computer-readable media 204 can also store instructions executable by an external CPU-type processor, executable by a GPU, and/or executable by an accelerator, such as an FPGA type accelerator, a DSP type accelerator, or any internal or external accelerator.

Executable instructions stored on computer-readable media 208 can include, for example, an operating system and other modules, programs, or applications that can be loadable and executable by processing units(s) 202. Alternatively, or in addition, the functionally described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, accelerator 222(N) can represent a hybrid device, such as one from ZYLEX or ALTERA that includes a CPU core embedded in an FPGA fabric.

The illustrative device(s) can further include one or more input/output (I/O) interface(s) 204 to allow the illustrative device(s) to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). The illustrative device(s) can also include one or more network interface(s) 206 to enable communications between the illustrative device(s) and other networked devices such as other device 200 over network(s) 104. Such network interface(s) 206 can include one or more network interface controllers (NICs) or other types of transceiver devices to send and receive communications over a network.

Furthermore, movement module 210, texture space blurring module 212, caching module 214, and drawing module 216 compose an illustrative motion blurring framework that can be distributively or singularly stored on any one or more of the illustrative device(s) 200. That is, some or all of the modules can be available to, accessible from, or stored on the cloud services devices 106 and/or user device(s) 102. In some examples, any number of modules could be employed and techniques described herein as employed by one module can be employed by any other(s) module in various examples.

In at least one example, movement module 210 can calculate the displacement of primitive(s) through a scene. Displacement, as defined herein, is a change in position over time or between frames. In other words, displacement can be a velocity or, more generally, "movement." In some examples the calculated displacement comprises a vector. In at least one example, the movement module 210 can calculate the displacement of one or more vertices of the primitive 110. In at least one example, the movement module 210 can calculate the displacement of a vertex of a primitive for every frame to be drawn. In various examples, the movement module 210 can identify a location of the primitive and calculate the displacement of the location. The movement module 210 can use texture detection to choose this location. In some examples, the movement module 210 can calculate the displacement of a vertex of a primitive at a specified number of frames from the last frame calculated. In some examples, the movement module 210 can store or coordinate with the caching module 214 to store displacement information. In at least one example, the movement module 210 can calculate the displacement and the difference in texture space. In some examples, the movement module can calculate the displacement and the difference in scene space.

In at least one example, the movement module 210 can also calculate the difference between one displacement and another displacement. For example, the movement module 210 can calculate the difference between a displacement of a vertex of a primitive in a first frame and a displacement of the same or another vertex of the same or another primitive in a second frame. In various examples, the movement module 210 can also calculate the difference between displacement of multiple vertices of one primitive. In at least one example, the displacement calculated can be a vector. In some examples the difference calculated can also be a vector. In various examples, the difference calculated can be an absolute value of a vector difference between two vectors.

In at least one example, the movement module 210 can also compare displacements to ascertain whether the displacements are similar or, equivalently, "close enough" to use blurred texture space data from a prior frame. In some examples, the movement module 210 can compare the displacement of a primitive (In at least one example at least one vertex of the primitive) in a current frame to the primitive in a frame when blurred texture space data was last generated (or if blurred texture space data has not been generated, to the last frame) ("the prior frame") by calculating a difference between the displacement of the primitive in the current frame and receiving the displacement of the primitive in the prior frame. In at least one example, the movement module 210 can determine whether the difference was greater than or less than a threshold difference in order to determine whether the displacements are similar. In some examples, the threshold difference can comprise a number of texels, an angle, or a combination of the two, among other suitable thresholds. For example, the threshold difference can be 40 texels. In another example, the threshold difference can be 40 texels and 2°. In various examples, the threshold difference may be measured in scene space additionally or in place of texture space.

After receiving or calculating the displacement of a primitive in a current frame and the displacement of the primitive in the prior frame, the movement module 210 can calculate a difference between the displacement of the primitive in the current frame and the displacement of the primitive in the prior frame. In at least one example, this difference is an absolute difference. In some examples, this difference can be a vector. The movement module 210 can then determine whether the difference exceeds or does not exceed a threshold.

In at least one example, depending on the outcome of the determination, the texture space blurring module 212 can either re-blur the texture space data to generate new blurred texture space data to be used to generate a blurred primitive or the texture space blurring module 212 can use the blurred texture space data generated for the prior frame to generate a blurred primitive. In at least one example, the texture space blurring module 212 can re-blur the texture space data if the difference is not less than the threshold difference. In such examples, there can be motivation to create newly blurred texture space data to correspond increased displacement of the primitive in the current frame. In other words, the texture space blurring module 212 can implement this method in order to increase the amount of blur based on increased displacement. In at least one example, the texture space blurring module 212 can re-blur the texture space data by retrieving the (original) texture space data and blurring the texture space data based at least in part on the current displacement.

In at least one example, the texture space blurring module 212 can use the blurred texture space data generated for a prior frame if the difference is not greater than the threshold difference. In other words, in such examples, if the displacement in the current frame is similar to the displacement of the frame for which the blurred texture space data was generated, the texture space blurring module 212 can used the blurred texture space data that was previously generated and stored. Put more simply, the texture space blurring module 212 uses cached blurred texture space data if the primitive in the current frame displaces similarly to the displacement of the primitive in a prior frame for which the cached blurred texture space data was generated and stored. In this example, similarity can be defined as a difference not being greater than the threshold difference. In some examples, if the difference equals the threshold difference, the texture space blurring module 212 can re-blur the texture space data. In various examples, the texture space blurring module 212 can blur the texture space data before the threshold is exceeded or the threshold can be reduced to prevent "choppy" transitions in the blur.

In at least one example, texture space blurring module 212 generates blurred texture space data. In at least one example texture space data includes a mapping of scene space data such as, for example, an image or three-dimensional model of primitive 110, to texture space. In some examples, the texture space data can comprise an arbitrary shape. In various examples, the arbitrary shape can be contained with an image generated to encompass the arbitrary shape. Any suitable method to read, modify, or transform the data of the arbitrary shape can be used. In at least one example a primitive can comprise an arbitrary shape. In that example, shader(s) can map the scene space data to texture space data and modify the texture space data or the scene space data to implement projections, scaling, cropping, replication, or other operations. Examples of file types that may be mapped to texture space include, but are not limited to .rla and .rlb, .pic, .alias, .rgb, .jpg, .png, .exr, .tif, .iff, .picture, .hdr, .ppm, .tga, .lwi, .bmp, .dds, .qnt, .ct, .st, .vt and .wt, .zt, .nt and .mt, .tt, .bit, .map., and others. In some examples, texture space data comprises procedural textures computed by shaders. In at least one example, the texture space blurring module can blur texture space data based at least in part on a displacement of a vertex of a primitive, where the texture space data corresponds to the texture of the primitive in scene space. In some examples, the displacement can be calculated and received from the movement module 210 or, in various examples, from some other source such as the cloud services 106. Any blurring techniques can be used by the texture space blurring module 212. In some examples, the texture space blurring module 212 may use geometry extrusion or a Gaussian blur.

In at least one example, the texture space blurring module 212 receives texture space data and a displacement vector for at least one vertex of a primitive corresponding to the texture space data, and constructs a new geometry having dimensions. In at least one example, the dimensions of the new geometry are calculated by displacing the texture space data along the displacement vector and a negative of the displacement vector and recording the coordinates which the texture space data reaches upon being displaced in each direction. In other words, the texture space blurring module 212 can determine how much space will be needed for the blurred texture space data by displacing the texture space data forwards and backwards from an initial position of the texture space data in texture space along the displacement vector and recording the coordinates in scene space reached by displacing the texture space data. In at least one example, the texture space blurring module 212 can then form a rectangle that encompasses these coordinates. In some examples, any appropriate shape can be used to encompass the coordinates and to correctly map to the primitive in scene space (e.g., geometric primitive, the shape of a mapping of a geometric primitive to texture space, triangle, circle, ellipse, etc.). In this example, if the displacement vector received includes a vector in scene space, the texture space blurring module 212 can convert the displacement vector to a texture space displacement vector before displacing the texture space data to derive the dimensions of the new geometry.

In at least one example, the texture space blurring module 212 can render the content of the new geometry (the "blurred texture space data") by walking each texel of the texture space data along the displacement vector and a negative of the displacement vector originating from the location of each texel. For one example where the primitive includes a rectangle and the corresponding texture space data is also, therefore, rectangular, this results in an image (in texture space) that looks like a rectangle that was "streaked" or "blurred" for the direction and magnitude of the displacement vector. In some examples, the texture space blurring module 212 can walk a subset of all of the texels of the texture space data along the displacement vector. In various examples, the texture space blurring module 212 can dynamically determine which portions of the texture space data to blur.

In some examples, the texture space blurring module 212 can vary the intensity or opacity of the texels as the texels are walked along the displacement vector. In various examples, the opacity of the texel may vary as a function of location. In some examples, opacity of texels may vary as a function of luminosity of the primitive. For example, the texture space blurring module 212 can determine that portions of the primitive or the texture space data are more or less luminous and therefore scale the opacity of the portion based at least in part on whether the portion is more or less luminous. For example, if the primitive comprised a light directed at the POV and a non-reflective portion that was occluded from a light source in the scene, the texels composing the light in texture space would be accorded greater opacity and the texels composing the non-reflective occluded portion would be accorded less opacity. In various examples, a user can choose the amount by which opacity would increase or decrease.

In various examples, the texture space blurring module 212 may receive at least one animation curve for a primitive in a scene and blur the texture space data before real-time. In this example, the texture space blurring module 212 can choose the amount of blur based on information about the animation curve. In various examples, the texture space blurring module 212 can blur the texture space data based at least in part on a maximal displacement of the primitive along the animation curve. In this example, the drawing module 216 can then use the blurred texture space data for the maximal displacement to interpolate intermediately blurred primitives using the un-blurred texture space data. In various examples, the texture space blurring module 212 can generate multiple instances of blurred texture space data for points along the animation curve that have different displacement vectors. In other various examples, the texture space blurring module 212 can complete part of the blurring process and the drawing module 216 can complete the blurring process upon a draw call. In some examples draw calls accomplish a variety of tasks by making calls from a graphics engine to a graphics application programming interface (API). These tasks can include rendering primitives on a display, rendering transformations of primitives, rendering shading of the primitives, and texture aliasing among others. In some examples drawing calls can be batched, which means that multiple draw calls can be combined so that only one batched draw call needs to be made by the graphics engine to accomplish all of the tasks that would be accomplished if each draw call were made individually.

In at least one example, caching module 214 can store data received, calculated, or generated for any images or frames. In at least one example, the caching module 214 can store displacement vector(s) calculated and blurred texture space data for one or more primitives. In at least one example, the caching module 214 can also store the texture space data (original un-blurred texture space data). In at least one example, the caching module 214 stores data in a cache. In some examples, the cache can comprise central processing unit cache, memory cache, graphics processing unit cache, a translation lookaside buffer, disk cache, or a web cache, among others. Any cache that provides data quickly can be suitable. In various examples, the caching module 214 could additionally or alternatively store data in other forms of memory.

In at least one example, the caching module 214 provides the displacement vector(s) of the frame when the last blurred texture space data was generated. In some examples, the caching module 214 can also store primitives, animation paths, and metadata.

In at least one example, the caching module 214 stores displacement vector(s) and blurred texture space data for a seed frame, where a seed frame is frame for which the caching module 214 stores displacement vector(s) and blurred texture space data corresponding at least in part to displacement vector(s) and blurred texture space data calculated and generated for the frame. After storing the displacement vector(s) and blurred texture space data for the seed frame, the caching module 214 provides the displacement vector(s) for the seed frame to the movement module 210 so that the movement module 210 can compare the displacement vector(s) of the seed frame to displacement vector(s) of the current frame. In at least one example, the caching module 214 will continue to provide the same displacement vector(s) until the motion module 210 determines that a displacement vector of a current frame is not similar to the displacement vector(s) of the seed frame, in which case the caching module 214 stores the displacement vector(s) of the current frame as the displacement vector(s) of a new seed frame and stores blurred texture space data for the current frame.

In various examples, when the displacement vector of the current frame is not similar to the displacement vector(s) of the seed frame, the caching module 214 can decide to not store the displacement vector(s) or blurred texture space data for the current frame. In those examples, the drawing module 216 can interpolate between previously stored blurred texture space data and un-blurred texture space data or the texture space blurring module 212 can generate new blurred texture space data that the caching module 214 does not replace with the blurred texture space data in the cache. In some examples, the caching module 214 may store displacement vector(s) and blurred texture space data for multiple frames.

In at least one example, the drawing module 216 maps texture space data, whether blurred or un-blurred, to scene space. In at least one example, the drawing module 216 can also draw geometry, viewpoint, texture, lighting, and shading information for a scene. In at least one example, the drawing module 216 maps blurred texture space data generated for a previous frame and stored by the caching module 214 to draw the primitive in a current frame if the movement module 210 determines that the displacement of the primitive in the current frame is similar to the displacement of the primitive in the frame for which the blurred texture space data was generated (referred to herein as the "seed frame").

In some examples, the drawing module 216 can combine blurred texture space data with un-blurred texture space data to generate a primitive with an intermediate level of blur. In some examples, the drawing module 216 can "pull" more or less from the blurred texture space data and more or less from the un-blurred texture space data depending on the particular current frame. In at least one example, the drawing module 216 can interpolate between the blurred texture space data and the un-blurred texture space data based at least in part on the displacement of the primitive in the current frame and the relationship of the displacement of the primitive in the current frame to the displacement of the primitive in the frame for which the blurred texture space data was blurred and stored. For example, if the movement module 210 determines that the displacement for the current frame lies in the same direction as but has a magnitude less than the displacement for the seed frame, then the drawing module 216 can use both un-blurred texture space data and the blurred texture space data for the seed frame to generate a blurred primitive for the current frame. In some examples, the drawing module 216 can scale the amount that the blurred texture space data is used and the amount that the un-blurred texture space data is used based at least in part on the magnitude of the displacement of the primitive in the current frame.

Illustrative Operations

FIGS. 3-9 are diagrams of illustrative processes of rendering motion-blurred primitives in real-time using blurred texture space data stored in a cache. The processes are illustrated as a collection of blocks in logical flow graphs, which represent a sequence of operations that can be implemented in hardware, software, or a combination thereof. In the context of software, the blocks represent computer-executable instructions stored on one or more computer-readable storage media that, when executed by one or more processors, perform the recited operations. Computer-executable instructions can include routines, programs, objects, components, data structures, and the like that perform particular functions or implement particular abstract data types. The order in which the operations are described is not intended to be construed as a limitation, and any number of the described blocks can be combined in any order and/or in parallel to implement the illustrated process. One or more of the processes described herein can occur independently or in relation in any order, whether in series or parallel.

Figure 3:
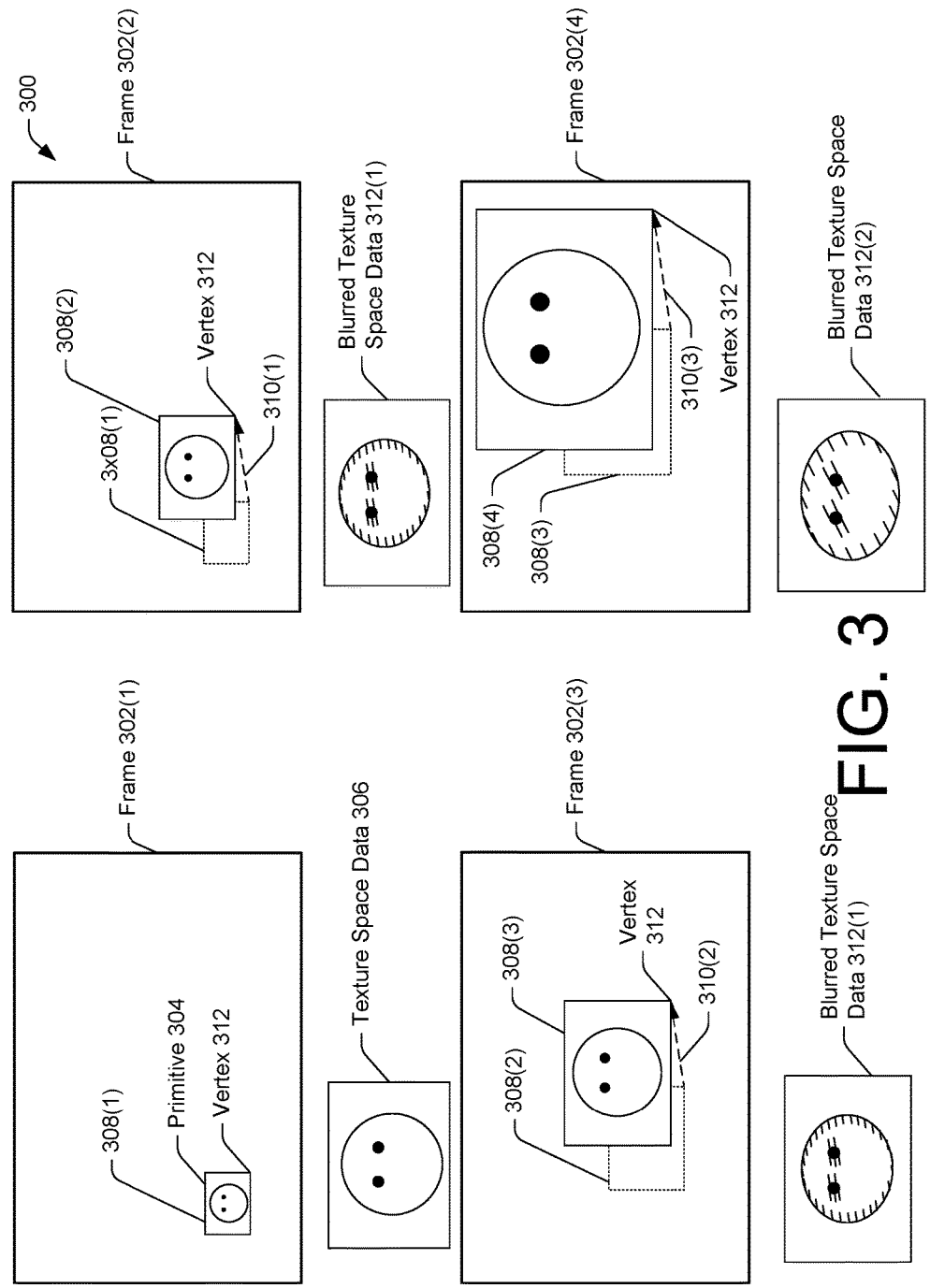
FIG. 3 is a block diagram depicting an illustrative process for generating a motion-blurred primitive.

FIG. 3 is a block diagram depicting an illustrative process for generating a motion-blurred primitive. FIG. 3 depicts four sequential frames of an animation (302(1)-(4)). In some examples, the techniques described herein can be used on an image and displacement may be calculated from information about the scene. The frames of the animation include an exemplary primitive 304 that is to move from a lower-left location in a display 108 upon which the frames 302(1)-(4) are to be rendered to an upper right location while increasing in size (see frames 302(1) and 302(4)). In some examples, although FIG. 3 depicts a rectangular primitive, the primitive may be a geometric primitive, a rectangle, a triangle, any other polygon, or any other shape. The example primitive 304 includes a circle and two dots so the texture space data 306 that is the source for the texture of the primitive 304 comprises a circle and two dots.

In frame 302(1) the primitive 304 has not yet moved, so motion blur is not necessary the process 300 can then make the drawing call, mapping the texture space data 306 to scene space at the location of the primitive 308(1). In some examples, the process 300 can instead generate motion blur by assuming a displacement of the primitive 304. In order to do so accurately the process 300 would need to have knowledge or an estimate of the future path of the primitive 304. In some examples, the process 304 can infer from the particular use environment (e.g., the program, operating system, kernel, user input, device type, etc.) or recent displacements an estimated displacement. In at least one example the texture space data 306 is stored in the cache. Texture space data, as used herein, is the source texture for primitives. To derive texture space data, pixels of the primitives are mapped from scene space (e.g., described in x, y, and z coordinates) to texture space (e.g., described in u and v coordinates).

For frame 302(2), the primitive is to move from location 308(1) to location 308(2). In order to generate motion blur for the primitive 304, the process 300 calculates a first displacement 310(1) of the primitive 304. In at least one example, the process 300 can calculate a displacement 310(1) of the primitive 304 by finding a change in location of a vertex 312 of the primitive 304. In at least one example, this change of location can comprise a vector 310(1). In some examples, the change of location, or displacement, can be a magnitude. In some examples, the displacement can be calculated by subtracting an initial position from a final position or an initial position vector from a final position vector, depending on the data available. In some examples, the process 300 can additionally account for the number of frames since a displacement was last calculated.

After calculating the first displacement 310(1), the process 300 blurs the texture space data based at least in part on the first displacement 310(1) to receive blurred texture space data 312(1). Hash marks appearing on the blurred texture space data 312(1) in FIG. 3 represent streaks resulting from blurring. The process 300 can increase the opacity of portions or all of the texture space data 306. In at least one example, the first displacement includes a magnitude and direction which are entered as parameters into the blurring method. The process 300 can store the blurred texture space data 312(1) and the first displacement in cache. Blurred texture space data and displacement information stored in the cache are referred to herein as seed blurred texture space data and seed displacement. In at least one example, the process 300 does not replace the texture space data 306, but keeps it available, either in cache or other storage. The process 300 can make the drawing call, mapping the blurred texture space data 312(1) to scene space to generate a motion-blurred primitive 304.

At frame 302(3), the primitive is to move from location 308(2) to 308(3). The process 300 can calculate a second displacement 310(2) and compare the second displacement to the first displacement. In at least one example, the comparison can be a vector difference between displacements. In some examples, the comparison can be an absolute difference between displacements. In at least one example and, as depicted in FIG. 3 at frame 302(3), the process 300 can reuse the blurred texture space data 312(1) stored in cache to draw a motion-blurred primitive 304 in frame 302(3) if the process 300 determines that the first displacement is similar to the second displacement. A developer may choose a threshold value to define what is similar and what is not similar. For example, a developer may choose a value of 40 texels and vary that threshold based on the quality of the results (if the blur is too choppy, the value should be adjusted downwards, causing the threshold to be exceed more frequently, thereby necessitating re-blurring more frequently).

At frame 302(4), the primitive is to move from location 308(3) to 308(4). The process 300 can calculate a third displacement 310(3) and compare the third displacement 310(3) to the seed displacement 310(1). In some examples, the process 300 can compare the third displacement 310(3) to the last displacement calculated that did not exceed the threshold or that was otherwise determined to be similar to the seed displacement. In at least one example, and as depicted in FIG. 3 at frame 302(4), the process 300 determines that the third displacement 310(3) is not similar to the seed displacement 310(1). Since the process 300 determined that the third displacement 310(3) is not similar to the seed displacement 310(1), the blurred texture space data 312(1) will not be suitable to generate seamlessly realistic motion blur. Therefore, the process 300 can re-blur the texture space data 306 to generate second blurred texture space data 312(2) based at least in part on the third displacement 310(3). The process 300 can store the second blurred texture space data 312(2) and the third displacement 310(3) in the cache as the new seed data and can draw a motion-blurred primitive based at least in part on the second blurred texture space data 312(2). The process 300 can use the third displacement 312(2) as the seed displacement to compare subsequent displacements to for subsequent frames and the second blurred texture space data 312(2) would be used to generate a motion-blurred primitive 304 until a subsequent displacement is not similar, at which time the texture space data would be re-blurred, the subsequently blurred texture space data and subsequent displacement would be stored, and the subsequently blurred texture space data would be used to generate motion blurred primitives.

Figure 4:
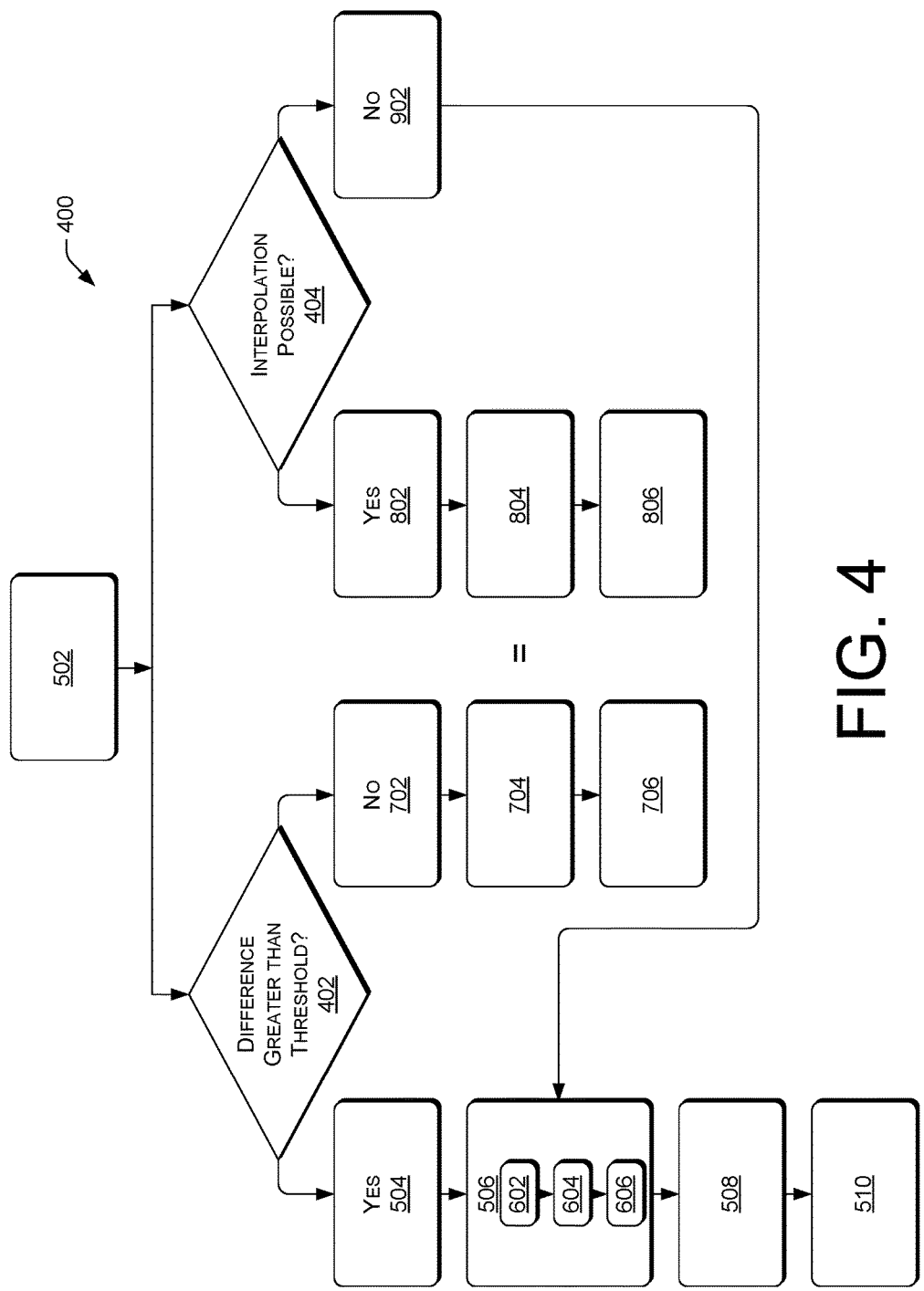
FIG. 4 is a flow diagram illustrating an example relationship between a variety of example processes for motion blur using cached texture space blur.

FIG. 4 is a flow diagram of an illustrative process 400 to generate motion-blurred primitives. FIG. 4 illustrates at least one example of how various example processes (e.g., processes 500, 600, 700, 800, and 900) can be combined to generate motion-blurred primitives using cached texture space data. In particular, FIG. 4 demonstrates how various examples processes (e.g., processes 500, 600, 700, 800, and 900) may be related by determinations (e.g., 402 corresponding to 504 and 702 and 404 corresponding to 802 and 902). In at least one example, the processes 500 and 700 may be related by a first determination 402 where device(s) 102 determine whether or not a difference between a displacement of a primitive in a current frame and a former displacement of the primitive in a prior frame is greater than a threshold (402). In at least one example, different processes (e.g., portions of 500 and 700) can be executed depending on the outcome of this determination (402). In at least one example, step 506 can be accomplished by process 600 (e.g., steps 602-606).

In some examples, the process 400 can include a second determination 404 that occurs simultaneously, previously, after, or in place of the first determination 402. In some examples, device(s) 102 can make the second determination 404 wherein the device(2) 102 determine whether or not interpolation between a current movement and a prior movement is possible. Depending on the outcome of this determination 404, different processes (e.g., portions of 800 and 900) can be executed. In at least one example step 704 and step 804 of processes 700 and 800, respectively, can be substantially similar or the same as is indicated by the equal sign.

In some examples, the. For example, motion-blurred primitives can be generated according to the described techniques by omitting 404, 802, 804, 806, and 902.

Figure 5:
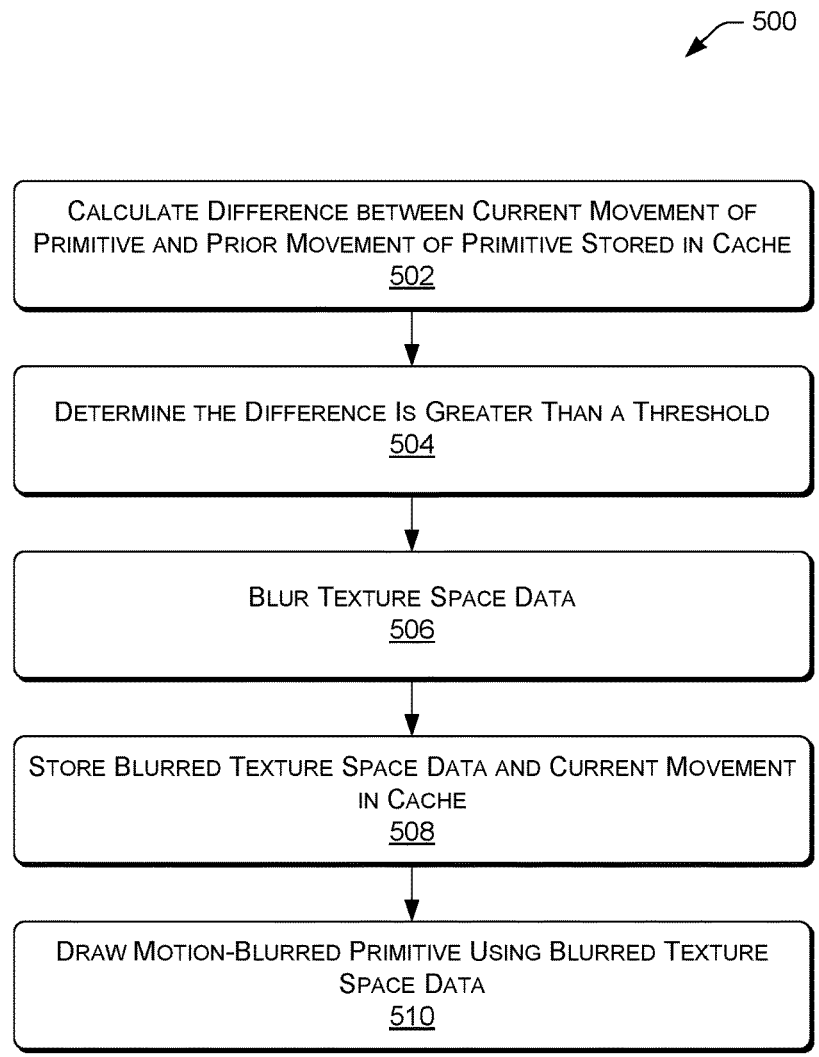
FIG. 5 is a flow diagram illustrating an example process to draw motion blur for a scene element in a current frame.

FIG. 5 is a flow diagram of an illustrative process 500 to generate motion-blurred primitives based on blurred texture space data stored in cache when the difference between a current movement of a primitive and a prior movement of the primitive is dissimilar or when there is no prior movement data. The process 500 is described with reference to the illustrative environment 100, and can be performed by device(s) 102, 106, 200 or any other device or combination thereof. Of course, the process 500 (and other processes described herein) can be performed in other environments and/or by other devices.

In at least one example, at 502, device(s) 102 calculates a difference between a current movement of a primitive and a prior movement of a primitive, the prior movement being previously stored in a cache accessible to the device(s) 102. In at least one example, the current movement includes a displacement of a vertex of a primitive between a previous frame and a current frame and the prior movement is a displacement of the primitive between a prior frame and a frame previous to the prior frame. In at least one example, the current movement includes the displacement of multiple vertices of the primitive between a previous frame and a current frame. In these examples, current movement and the prior movement are both vectors and the difference is a vector difference. In at least one example, frames can be frames of animation. In some examples, frames can be sequential images.

In some examples, the process 500 can include an additional step between 452 and 504. At this step the device(s) 102 can map the movements or the difference to source space. In some examples, the device(s) 102 can map the movements or the difference to source space in order to correctly model the characteristics of the blur in texture space since texture space does not always appear to the human eye to be the same as the blur in object space. In at least one example, mapping can be accomplished by converting values in Cartesian coordinates to values in u, v texture space coordinates.

In at least one example, at 404, the device(s) 102 can determine an amount that the difference is greater or less than a threshold (i.e., determining "similarity"). In at least one example, the threshold can be a magnitude (e.g., a number of texels, a number of pixels, etc.). In some examples, the threshold can be a vector.

In at least one example, at 506, the device(s) 102 blurs the texture space data based at least in part on the movement of the primitive in the current frame to generate blurred texture space data. Alternatively, if there are no prior frames or if there is no prior movement of the primitive, the device(s) 102 can blur the primitive based at least on the movement of the primitive in the current frame and without completing 504.

In at least one example, at 508, the device(s) 102 stores the blurred texture space data and the current movement in cache. In at least one example, the blurred texture space data can be re-used to generated motion-blurred primitives until the device(s) 102 determines that a subsequent movement is not similar to the current movement.

In at least one example, at 510, the device(s) 102 draws a motion-blurred primitive based at least in part on mapping the blurred texture space data stored in the cache to scene space.

Figure 6:
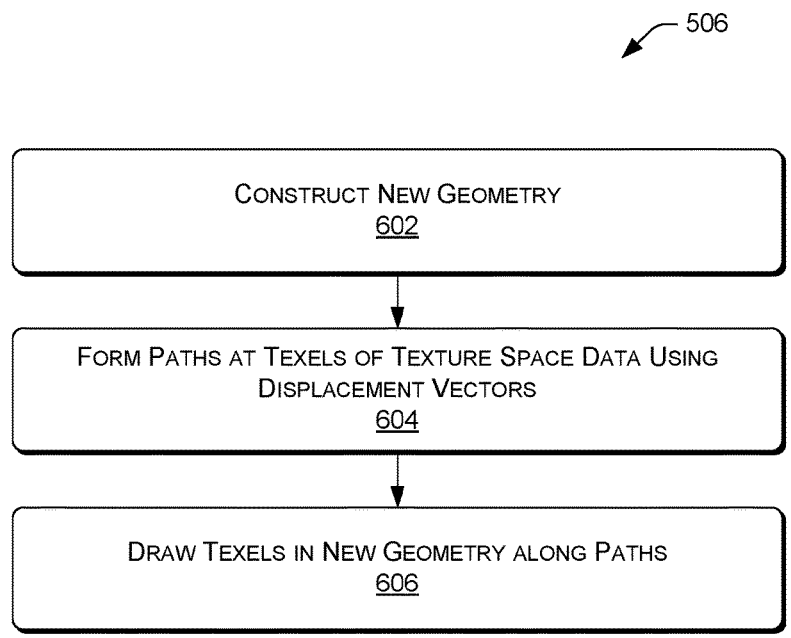
FIG. 6 is a flow diagram illustrating an example process to blur texture space data.

FIG. 6 is a flow diagram of an illustrative process 506 to blur texture space data based at least in part on a displacement vector.

In at least one example, at 602, the device(s) 102 constructs a new geometry having dimensions. In at least one example, the dimensions of the new geometry are determined by displacing the texture space data along a displacement vector representing the movement of the primitive in the current frame and a negative of the displacement vector. The resulting new geometry encompasses the displacement of the texture space data forwards and backwards. In this example, if the displacement vector received includes a vector in scene space, the computer resource can convert the displacement vector to a texture space displacement vector before displacing the texture space data to derive the dimensions of the new geometry.

In at least one example, at 604 the device(s) 102 can form paths by using the negative and positive magnitude and direction of displacement vector(s) located at texels composing the texture space data. In other words, the device(s) 102 computes a path through texels of the texture space data that corresponds to the movement of the primitive in scene space.

In at least one example, at 606, the device(s) 102 draws texels in the new geometry along the paths. This results in texture space data that looks streaked.

Figure 7:
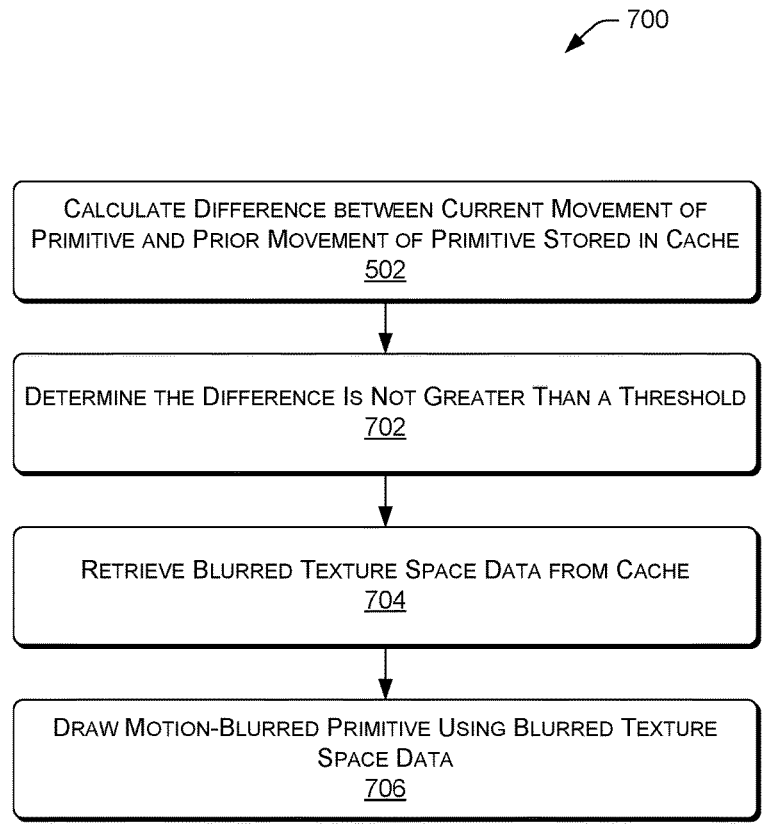
FIG. 7 is a flow diagram illustrating an example process to draw motion blur for a scene element in a current frame.

FIG. 7 is a flow diagram of an illustrative process 700 to generate motion-blurred primitives based on blurred texture space data stored in cache when the difference between a current movement of a primitive and a prior movement of the primitive is similar.

In at least one example, at 502, the device(s) 102 calculates the difference between a current movement of a primitive and a prior movement of a primitive, the prior movement being previously stored in a cache accessible to the device(s) 102. In at least one example, the current movement and the prior movement are both vectors and the difference includes a vector difference.

In at least one example, at 702, the device(s) 102 determines that the difference is not greater than a threshold (i.e., determining "similarity"). In some examples, the device(s) 102 can determine that the difference is less than a threshold. In at least one example, the threshold can be a magnitude (e.g., a number of texels, 40 texels, a number of pixels, etc.). In some examples, the threshold can be a vector.

In at least one example, at 704, the device(s) 102 retrieves blurred texture space data from a cache. In at least one example, the blurred texture space data was previously stored by the device(s) 102 after blurring texture space data based at least in part on a movement of the primitive that is similar to the movement of the primitive in the current frame. In some examples, the device(s) 102 may alternatively receive the blurred texture space data from cloud services 106.

In at least one example, at 706, the device(s) 102 draws a motion-blurred primitive for the current frame based at least in part on the blurred texture space data. In at least one example, drawing the motion-blurred primitive comprises mapping the blurred texture space data to scene space.

Figure 8:
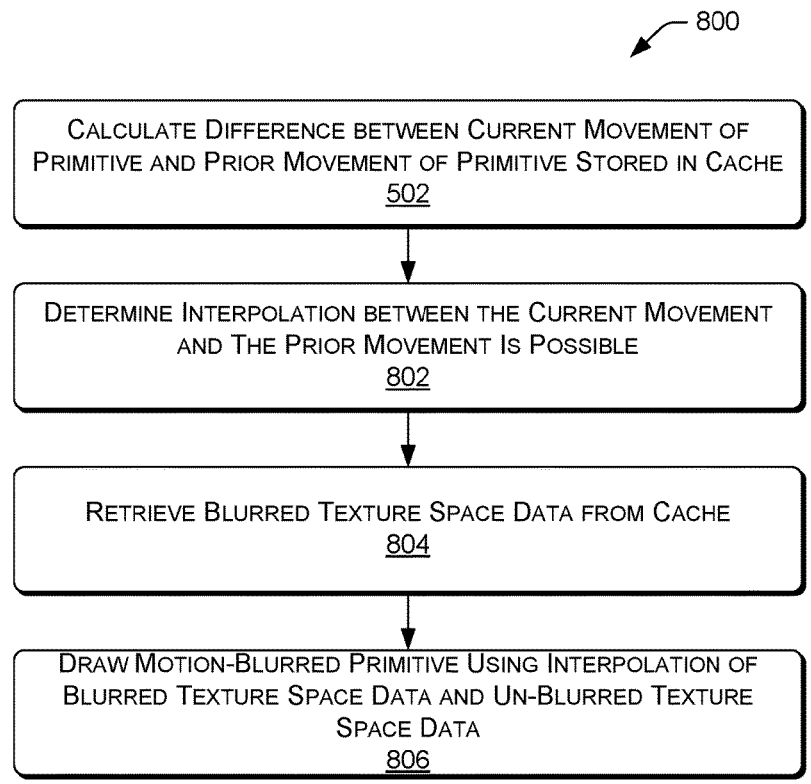
FIG. 8 is a flow diagram illustrating an example process to determine whether interpolation of blurred texture space data and un-blurred texture space data can be used to draw a motion-blurred primitive and, if so, to draw a motion-blurred primitive using interpolation of blurred texture space data and un-blurred texture space data.

FIG. 8 is a flow diagram of an illustrative process 800 to generate motion-blurred primitives based on blurred texture space data stored in cache when it is possible to interpolate between the current movement and the prior movement.

In at least one example, at 502, the device(s) 102 calculates the difference between a current movement of a primitive and a prior movement of a primitive, the prior movement being previously stored in a cache accessible to the device(s) 102. In at least one example, the current movement and the prior movement are both vectors and the difference includes a vector difference.

In at least one example, at 802, the device(s) 102 determines that interpolation between the prior movement and zero to achieve the current movement is possible. In some examples, the device(s) 102 makes this determination by determining that the current movement includes a vector of a similar angle (less than a threshold angle difference—e.g., 2° depending on the application) to the angle of the prior movement and has a magnitude less than the prior movement. In various examples, the device(s) 102 can use other methods to determine when interpolation between a vector and zero is appropriate.

In at least one example, at 804, the device(s) 102 retrieves blurred texture space data from a cache. In at least one example, the blurred texture space data was previously stored by the device(s) 102 after blurring texture space data based at least in part on a movement of the primitive that is similar to the movement of the primitive in the current frame. In some examples, the device(s) 102 may alternatively receive the blurred texture space data from cloud services 106.

In at least one example, at 806, the device(s) 102 draws the motion-blurred primitive using an interpolation of un-blurred texture space data and the blurred texture space data. In at least one example, the device(s) 102 does this when it makes the drawing call. The device(s) 102 can pull more from the un-blurred texture space data or the blurred texture space data depending on whether the primitive should be more or less blurred.

Figure 9:
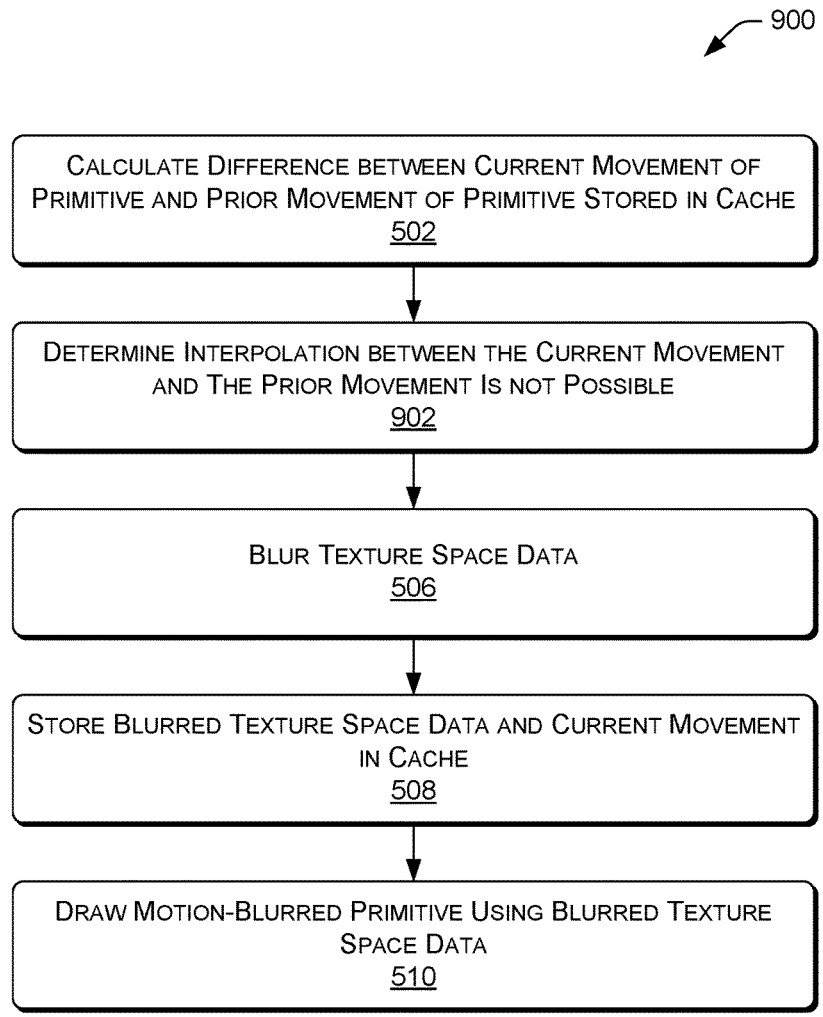
FIG. 9 is a flow diagram illustrating an example process to determine whether interpolation of blurred texture space data and un-blurred texture space data can be used to draw a motion-blurred primitive and, if not, to blur texture space data, store the blurred texture space data, and draw a motion-blurred primitive using the blurred texture space data.

FIG. 9 is a flow diagram of an illustrative process 900 to generate motion-blurred primitives based on blurred texture space data stored in cache when it is not possible to interpolate between the current movement and the prior movement.

In at least one example, at 502, the device(s) 102 calculates the difference between a current movement of a primitive and a prior movement of a primitive, the prior movement being previously stored in a cache accessible to the device(s) 102. In at least one example, the current movement and the prior movement are both vectors and the difference is a vector difference.

In at least one example, at 506, the device(s) 102 blurs the texture space based at least in part on the movement of the primitive in the current frame to generate blurred texture space data. Alternatively, if there are no prior frames or if there is no prior movement of the primitive, the device(s) 102 can blur the primitive based at least on the movement of the primitive in the current frame and without completing 404.

In at least one example, at 508, the device(s) 102 stores the blurred texture space current movement in cache. In at least one example, the blurred texture space data will be re-used to generated motion-blurred primitives until the device(s) 102 determines that a subsequent movement is not similar to the current movement.

In at least one example, at 510, the device(s) 102 draws a motion-blurred primitive based at least in part on mapping the blurred texture space data stored in the cache to scene space.

In at least one example, at 410, the device(s) 102 draws a motion-blurred primitive based at least in part on mapping the blurred texture space data stored in the cache to scene space.

Example Clauses

A. A method comprising: rendering motion blur for a scene element (400), the rendering comprising: calculating a difference between a movement (310(2)) of the scene element (304) in a current frame (302(3)) and a prior movement (310(1)) of the scene element in a prior frame (302(2)); determining that the difference is not greater than a threshold difference (702); retrieving blurred texture space data (704); and drawing a motion-blurred scene element in the current frame based at least in part on the blurred texture space data (706).

B. The method as paragraph A recites, wherein the blurred texture space data is texture space data blurred based at least in part on the prior movement.

C. The method as paragraph A recites, wherein the scene element is a rectangle.

D. The method as either paragraph A or B recites, wherein drawing the motion-blurred scene element comprises: identifying a region to be occupied by the scene element and blur of the scene element in the current frame; and mapping the blurred texture space data to the region.

E. The method as either paragraph A or B recites, wherein the movement comprises a first displacement vector that records displacement of a vertex of the scene element between a first two frames and the prior movement comprises a second displacement vector that records the displacement of the vertex of the scene element between a second two frames.

F. The method as any one of paragraphs A, B, or D recites, wherein the texture space data is an image of the scene element mapped to texture space.

G. A method comprising: receiving a first displacement vector (310(2)) and a second displacement vector (310(3)), the first displacement vector representing, at least in part, displacement of a vertex (312) of a primitive (304) in a prior frame (302(3)) and the second vector representing, at least in part, displacement (310(3)) of the vertex (312) of the primitive (304) in a current frame (302(4)); determining that a difference between the first displacement vector and the second displacement vector is not less than a threshold (504); blurring texture space data to create blurred texture space data (312(2)), wherein the texture space is a mapping of the primitive to texture space (306); storing the blurred texture space data and the second displacement vector (508); and rendering a motion-blurred primitive in the current frame based at least in part on the second blurred texture space data (510).

H. The method as paragraph G recites, wherein blurring the texture space data comprises: calculating dimensions for a new geometry in texture space, wherein the dimensions of the new geometry are based at least in part on displacing the texture space data along the second displacement vector and a negative value of the second displacement vector; drawing one or more texels of the texture space data along the second displacement vector of the texture space data and the negative value of the second displacement vector; and calculating texel intensities based at least in part on positions of respective texels along the second displacement vector and the negative value of the second displacement vector.

I. The method as paragraph H recites, wherein the texel intensities are calculated according to a Gaussian distribution.

J. One or more computer-readable media (208) storing computer-executable instructions (210-216) that, when executed on one or more processing units (202), configure a computer to perform acts comprising: calculating current displacement vectors for a vertex of a scene element in a current frame (302(3))); receiving former displacement vectors (310(1))and blurred texture space data (312(1)), the blurred texture space data comprising texture space data blurred based at least in part on the former displacement vectors (310(1)); calculating a measure of dissimilarity between the current displacement vectors and the former displacement vectors (502); if the measure of dissimilarity is not greater than a threshold value (702), drawing a scene element by mapping the blurred texture space data to scene space (704 and 706); and if the measure of dissimilarity is not less than the threshold value (504): blurring the texture space data based at least in part on the current displacement vectors to create second blurred texture space data (506); storing the second blurred texture space data and the current displacement vectors (508); and drawing the scene element by mapping the second blurred texture space data to scene space (510).

K. The one or more computer-readable media as paragraph J recites, wherein the texture space data is a mapping of pixels of the scene element in scene space to texels in texture space.

L. The one or more computer-readable media as paragraph J recites, wherein calculating current displacement vectors comprises calculating a difference between first positions of vertices of the scene element in a frame preceding the current frame and second positions of the vertices of the scene element in the current frame.

M. The one or more computer-readable media as either paragraph J or L recites, wherein the measure of dissimilarity comprises an absolute difference.

N. A system comprising: one or more processing units (202); and one or more computer-readable media (208) having computer-executable instructions stored thereon that, when executed by the one or more processing units, configure the one or more processors to perform acts comprising: calculating a first displacement of vertices of a primitive between a first frame and a previous frame (310(1)); blurring texture space data based at least in part on the first displacement to create blurred texture space data (310(1) and 506); storing the blurred texture space data and the first displacement (508); generating a motion-blurred primitive in the first frame (302(2)) using the blurred texture space data (510); calculating a second displacement of the vertices (310(2)) of the primitive (304) in between a frame following the first frame and the first frame or a second frame following the first frame (302(3)); and calculating a difference between the first displacement and the second displacement (502).

O. The system as paragraph N recites further comprising computer-executable instructions stored on the one or more computer-readable media that, when executed by the one or more processing units, configure the one or more processors to perform acts comprising: generating a second motion-blurred primitive in the second frame using the blurred texture space data if the difference between the first displacement and the second displacement is less than a threshold; and blurring the texture space data based at least in part on the second displacement to create second blurred texture space data if the difference between the first movement and the second movement is greater than a threshold.

P. The system as either paragraph N or O recites further comprising computer-executable instructions stored on the one or more computer-readable media that, when executed by the one or more processing units, configure the one or more processors to perform acts comprising: generating the second motion-blurred primitive in the second frame using the second blurred texture space data if the difference between the first movement and the second movement is greater than a threshold.

Q. The system as any one of paragraphs N, O, or P recites further comprising computer-executable instructions stored on the one or more computer-readable media that, when executed by the one or more processing units, configure the one or more processors to perform acts comprising: generating the second motion-blurred primitive in the second frame by mapping an interpolation of the blurred texture space data and the texture space data to scene space of the second frame if the second displacement is in between the first displacement and zero.

R. The system as paragraph S recites, wherein the interpolation comprises weighting the blurred texture space data and the texture space data, the weighting being based at least in part on a magnitude of the second displacement.

S. The system as paragraph N recites, wherein calculating the first displacement and the second displacement comprises calculating displacement vectors in two dimensions of scene space.

T. The system as paragraph N recites, the storing comprising storing the blurred texture space data and the first displacement in cache storage.

U. A system comprising means for calculating current displacement vectors for a vertex of a scene element in a current frame (302(3))); receiving former displacement vectors (310(1))and blurred texture space data (312(1)), the blurred texture space data comprising texture space data blurred based at least in part on the former displacement vectors (310(1)); calculating a measure of dissimilarity between the current displacement vectors and the former displacement vectors (502); if the measure of dissimilarity is not greater than a threshold value (702), drawing a scene element by mapping the blurred texture space data to scene space (704 and 706); and if the measure of dissimilarity is not less than the threshold value (504): blurring the texture space data based at least in part on the current displacement vectors to create second blurred texture space data (506); storing the second blurred texture space data and the current displacement vectors (508); and drawing the scene element by mapping the second blurred texture space data to scene space (510).

V. The system as paragraph U recites, wherein the texture space data is a mapping of pixels of the scene element in scene space to texels in texture space.

W. The system as paragraph U recites, wherein calculating current displacement vectors comprises calculating a difference between first positions of vertices of the scene element in a frame preceding the current frame and second positions of the vertices of the scene element in the current frame.

X. The system as either paragraph V or W recites, wherein the measure of dissimilarity comprises an absolute difference.

CONCLUSION

Although the subject matter has been described in language specific to structural features and/or methodological acts, it is to be understood that the subject matter defined in the appended claims is not necessarily limited to the specific features or acts described. Rather, the specific features and steps are disclosed as example forms of implementing the claims.

All of the methods and processes described above can be embodied in, and fully automated via, software code modules executed by one or more general purpose computers or processors. The code modules can be stored in any type of computer-readable storage medium or other computer storage device. Some or all of the methods can alternatively be embodied in specialized computer hardware.

Conditional language such as, among others, "can," "could," "can" or "can," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A method comprising:
   rendering motion blur for a scene element, the rendering comprising:
      calculating a difference between a movement of the scene element in a current frame and a prior movement of the scene element in, a prior frame;
      determining whether the difference is greater than a threshold difference;
      retrieving blurred texture space data in response to determining that the difference is less than or equal to the threshold difference; and
      drawing a motion-blurred scene element in the current frame based at least in part on the blurred texture space data.

2. The method of claim 1, wherein the blurred texture space data is texture space data blurred based at least in part on the prior movement.

3. The method of claim 2, wherein the texture space data includes an image of the scene element mapped to texture space.

4. The method of claim 1, wherein the scene element is a rectangle.

5. The method of claim 1, wherein drawing the motion-blurred scene element comprises:
   identifying a region to be occupied by the scene element and blur of the scene element in the current frame; and
   mapping the blurred texture space data to the region.

6. The method of claim 1, wherein the movement comprises a first displacement vector that records displacement of a vertex of the scene element between a first two frames and the prior movement comprises a second displacement vector that records the displacement of the vertex of the scene element between a second two frames.

7. The method of claim 6 further comprising blurring texture space data to create the blurred texture space data, wherein blurring includes:
   calculating dimensions for a new geometry in texture space, wherein the dimensions of the new geometry are based at least in part on displacing the texture space data along the second displacement vector and a negative value of the second displacement vector;

drawing one or more texels of the texture space data along the second displacement vector of the texture space data and the negative value of the second displacement vector; and calculating texel intensities based at least in part on positions of respective texels along the second displacement vector and the negative value of the second displacement vector.

8. The method of claim 7, wherein calculating the texel intensities includes calculating according to a Gaussian distribution.

9. The method of claim 1, wherein the motion-blurred scene element is an element of one or more of an image, a video, or a three-dimensional model.

10. The method of claim 1, wherein calculating the difference further comprises calculating one or more differences between primitive movements of one or more primitives of the scene element in the current frame and prior movements of the one or more primitives of the scene element in the prior frame.

11. A system comprising:
one or more processing units; and
one or more computer-readable media having computer-executable instructions stored thereon that, when executed by the one or more processing units, configure the one or more processing units to perform acts comprising:
rendering motion blur for a scene element, the rendering comprising:
calculating a difference between a movement of the scene element in a current frame and a prior movement of the scene element in a prior frame;
determining whether the difference is greater than a threshold difference;
retrieving blurred texture space data in response to determining that the difference is less than or equal to the threshold difference; and
drawing a motion-blurred scene element in the current frame based at least in part on the blurred texture space data.

12. The system of claim 11, wherein the movement comprises a first displacement vector that records displacement of a vertex of the scene element between a first two frames and the prior movement comprises a second displacement vector that records the displacement of the vertex of the scene element between a second two frames.

13. The system of claim 12, wherein the instructions further configure the one or more processing units to blur texture space data to create the blurred texture space data, wherein blurring includes:
calculating dimensions for a new geometry in texture space, wherein the dimensions of the new geometry are based at least in part on displacing the texture space data along the second displacement vector and a negative value of the second displacement vector;

drawing one or more texels of the texture space data along the second displacement vector of the texture space data and the negative value of the second displacement vector; and calculating texel intensities based at least in part on positions of respective texels along the second displacement vector and the negative value of the second displacement vector.

14. The system of claim 13, wherein the instructions further configure the one or more processing units to store the blurred texture space data and the first displacement in cache storage.

15. The system of claim 12, wherein drawing the motion-blurred scene element in the current frame comprises:
mapping an interpolation of the blurred texture space data and the texture space data to scene space of the current frame if the second displacement vector is in between the first displacement vector and zero.

16. The system of claim 15, wherein the interpolation comprises weighting the blurred texture space data and the texture space data, the weighting being based at least in part on a magnitude of the second displacement vector.

17. The system of claim 11, wherein the texture space data is a mapping of pixels of the scene element in scene space to texels in texture space.

18. A computer-readable medium having stored thereon processor-executable instructions that, when executed by a processor, configure the processor to render motion blur for a scene element, the rendering comprising:
calculating a difference between a movement of the scene element in a current frame and a prior movement of the scene element in a prior frame;
determining whether the difference is greater than a threshold difference;
retrieving blurred texture space data in response to determining that the difference is less than or equal to the threshold difference; and
drawing a motion-blurred scene element in the current frame based at least in part on the blurred texture space data.

19. The computer-readable medium of claim 18, wherein the movement comprises a first displacement vector that records displacement of a vertex of the scene element between a first two frames and the prior movement comprises a second displacement vector that records the displacement of the vertex of the scene element between a second two frames.

20. The computer-readable medium of claim 18, wherein:
the blurred texture space data is texture space data blurred based at least in part on the prior movement,
the texture space data includes an image of the scene element mapped to texture space, and
the motion-blurred scene element is an element of one or more of an image, a video or a three-dimensional model.

* * * * *